J. H. COUGHLAN.
PORTABLE REFRIGERATOR.
APPLICATION FILED NOV. 18, 1911.
1,059,840.
Patented Apr. 22, 1913.
2 SHEETS—SHEET 1.
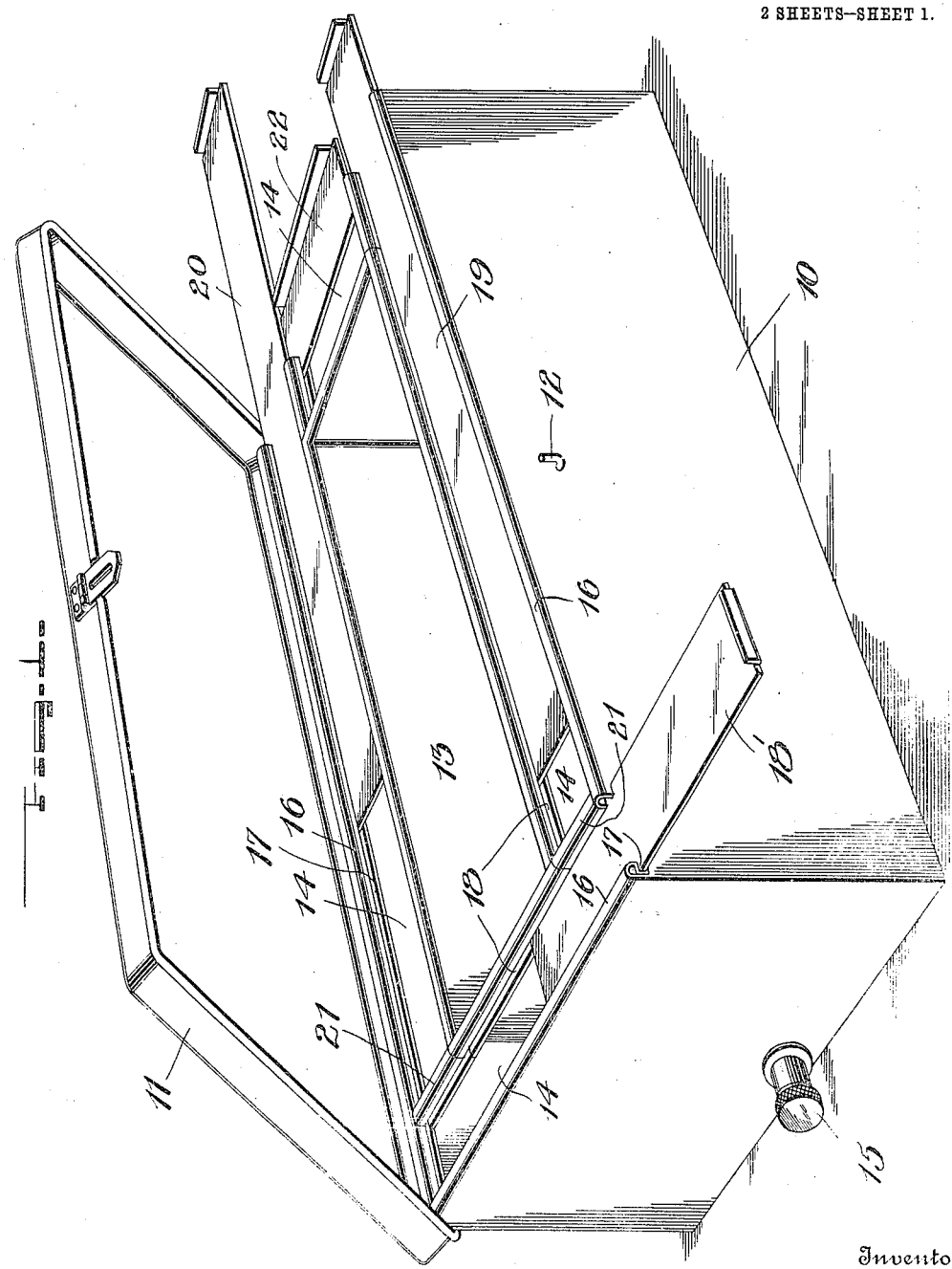
Inventor
J. H. Coughlan

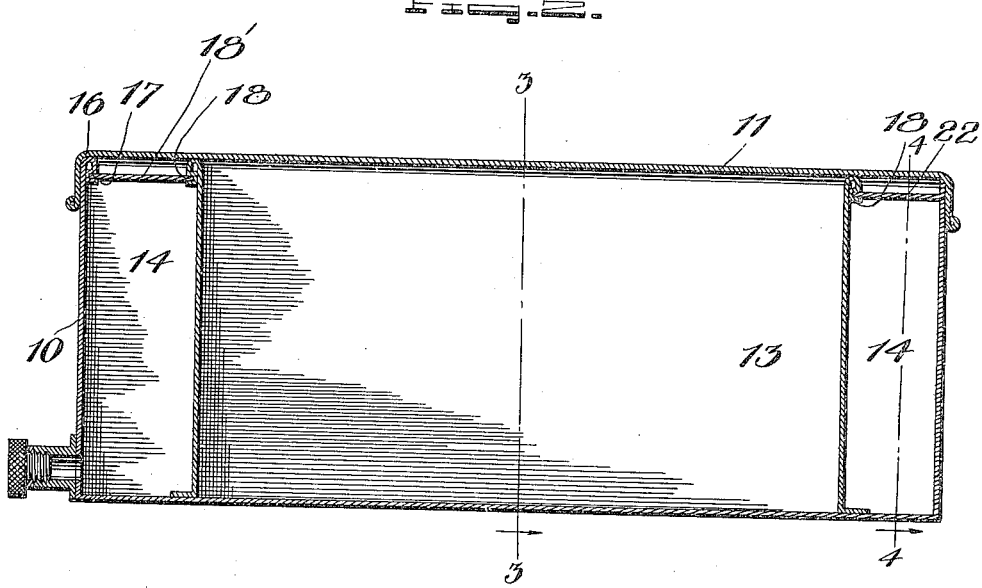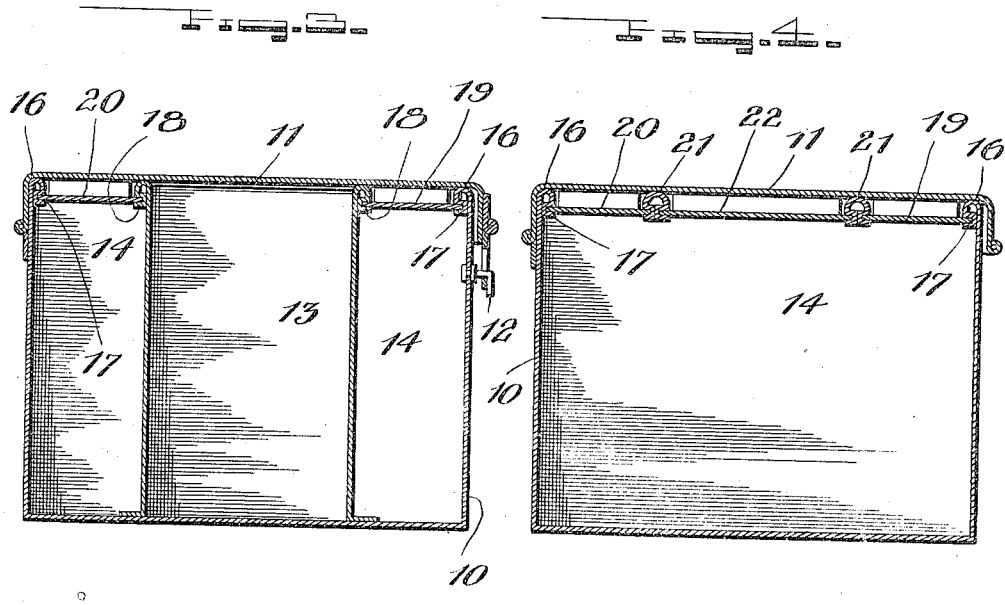

UNITED STATES PATENT OFFICE.

JEREMIAH H. COUGHLAN, OF BOSTON, MASSACHUSETTS.

PORTABLE REFRIGERATOR.

1,059,840.  Specification of Letters Patent.  Patented Apr. 22, 1913.

Application filed November 18, 1911. Serial No. 660,986.

*To all whom it may concern:*

Be it known that I, JEREMIAH H. COUGHLAN, a citizen of the United States, residing at Boston, in the county of Suffolk, State of Massachusetts, have invented certain new and useful Improvements in Portable Refrigerators; and I do hereby declare the following to be a full, clear, and exact description of the invention, such as will enable others skilled in the art to which it appertains to make and use the same.

My invention relates to new and useful improvements in refrigerating devices and more particularly to portable refrigerator cases and the object of my invention is to improve the construction and increase the efficiency of cases of the above described type.

A further object of my invention is the provision of a portable case comprising an outer receptacle and an inner receptacle positioned centrally within the outer receptacle, whereby an encircling ice receiving chamber is formed, said receptacles being braced together by braces which also serve as guides for a plurality of independent closures for the ice receiving chamber.

With these and other objects in view, my invention will be more fully described, illustrated in the accompanying drawings which show a preferred embodiment of my device and then specifically pointed out in the claims which are attached to and form a part of this application.

In the drawings, Figure 1 is a perspective of my improved device showing the same in open position. Fig. 2 is a central longitudinal section. Fig. 3 is a section on the line 3—3 of Fig. 2. Fig. 4 is a similar section on the line 4—4 of Fig. 2.

Referring more specifically to the drawings, in which similar reference numerals designate corresponding parts throughout, 10 designates in general the outer casing which as shown is preferably formed of sheet metal and provided with a hinged cover 11 adapted to be secured in closed position by means of a catch 12. Positioned centrally within this outer casing is an inner casing or food receptacle 13 also rectangular in shape and as shown, the bottom of the outer casing also forms the bottom of the inner casing, the walls of said inner casing being secured to the bottom by soldering or other preferred means. By this means an encircling space or ice receiving chamber 14 is formed about the inner casing and as a means for draining said chamber one of the end walls of the outer casing is provided with an outlet port having a detachable closing cap 15.

As shown the sides and one of the ends of the outer casing have their free edges bent inwardly upon themselves as at 16 and said inbent edge portions are further bent to form guides 17. Both sides and both ends of the inner receptacle have their upper portions bent outwardly and downwardly upon themselves to form similar guides 18 adapted to coact with the guides 17 to receive the sliding closures 18', 19 and 20 as shown. The corners of the inner casing are connected to the walls of the outer casing by means of braces 21 which braces, are preferably formed of sheet metal in the manner shown in Fig. 4 of the drawings by which means they form continuations of the guide ways for the closures 18', 19 and 20 and also form guide ways for a fourth closure 22. By this means the space between the upper edges of the inner and outer casings is completely closed by a plurality of independently removable closures while at the same time the inner casing is properly braced in place. As will be readily seen these braces do not in any way interfere with the passage of ice or water from one part of the encircling chamber to another and the entire chamber may therefore be drained through the single outlet previously described.

In operation the encircling chamber 14 is filled with crushed ice and then closed by means of the sliding closures, 18', 19, 20 and 22. The food is then placed within the inner casing and the cover 11 closed over the same. By this means the food may be kept cold as long as the ice remains unmelted and the ice may be readily removed at any time.

It will of course be understood that minor changes in details of construction may be made if desired, without in the slightest degree departing from the spirit of my invention.

What I claim is:—

1. In a portable refrigerator, in combination, an outer rectangular casing having one upper end edge turned inwardly and outwardly to form a guide way and its side edges turned inwardly and outwardly to form guide ways, an inner casing having its walls equally spaced from the outer casing and its upper edges turned inwardly and outwardly, guide members extending from one upper end of the inner casing to the side of the outer casing and guide members extending from the other upper end of the inner casing to an end of the outer casing, plates having reduced ends upturned to form gripping portions and their sides slidable in the side grooves, a similar plate slidable in one pair of end grooves, a plate having a reduced upwardly bent grip portion and its ends slidable in the other pair of end grooves, outlet means formed in the wall of the outer casing and a cover hinged to the top of the outer casing said cover having depending flanges which engage the upturned portions of the plates and lock the same in closed position simultaneously.

2. In a device of the kind described, an inner casing, an outer casing spaced from the inner casing, slides closing the tops of the spaces between said casings and provided with upturned edges, and means to close the inner casing and lock said slides simultaneously.

In testimony whereof, I affix my signature, in presence of two witnesses.

JEREMIAH H. COUGHLAN.

Witnesses:
MAE CLARK,
MARGARET M. COUGHLAN.